(12) United States Patent
Vogel et al.

(10) Patent No.: US 8,221,277 B2
(45) Date of Patent: Jul. 17, 2012

(54) DIFFERENTIAL PROVIDED WITH A DRIVE WHEEL

(75) Inventors: Manfred Vogel, Kappelrodeck (DE);
Volker Szentmihalyi, Gutach (DE);
Matthias Derse, Elzach (DE)

(73) Assignee: Neumayer Tekfor Holding GmbH, Hausach (DE)

( * ) Notice: Subject to any disclaimer, the term of this patent is extended or adjusted under 35 U.S.C. 154(b) by 0 days.

(21) Appl. No.: 12/573,172

(22) Filed: Oct. 5, 2009

(65) Prior Publication Data

US 2010/0062892 A1 Mar. 11, 2010

Related U.S. Application Data

(63) Continuation of application No. PCT/DE2008/000576, filed on Apr. 4, 2008.

(30) Foreign Application Priority Data

Apr. 5, 2007 (DE) .................. 10 2007 016 939
Apr. 4, 2008 (DE) .................. 10 2008 017 221

(51) Int. Cl.
*F16H 48/06* (2006.01)
(52) U.S. Cl. ..................................... 475/230
(58) Field of Classification Search .......... 475/230, 475/231
See application file for complete search history.

(56) References Cited

U.S. PATENT DOCUMENTS

| | | | | |
|---|---|---|---|---|
| 1,324,860 A | * | 12/1919 | Taylor | 475/233 |
| 4,363,248 A | * | 12/1982 | Brisabois | 475/230 |
| 4,455,889 A | * | 6/1984 | Hauser | 475/230 |
| 5,584,777 A | | 12/1996 | Sander et al. | |
| 5,938,558 A | * | 8/1999 | Eybergen et al. | 475/231 |
| 6,945,898 B2 | * | 9/2005 | Szuba | 475/230 |
| 2003/0144107 A1 | | 7/2003 | Orr et al. | |
| 2004/0134307 A1 | | 7/2004 | Pascoe et al. | |
| 2005/0164821 A1 | | 7/2005 | Santelli | |
| 2006/0229154 A1 | * | 10/2006 | Kakinami et al. | 475/222 |
| 2007/0032334 A1 | * | 2/2007 | Green, Jr. | 475/230 |
| 2008/0188343 A1 | * | 8/2008 | Pan et al. | 475/230 |

FOREIGN PATENT DOCUMENTS

| | | |
|---|---|---|
| DE | 83 20 356 U1 | 3/1985 |
| DE | 196 31 937 A1 | 2/1998 |
| DE | 103 04 124 A1 | 9/2003 |
| DE | 102 12 671 A1 | 10/2003 |
| DE | 603 01 784 T2 | 7/2006 |
| DE | 603 05 948 T2 | 10/2006 |
| EP | 1 219 865 A1 | 7/2002 |
| EP | 1 624 229 A | 2/2006 |
| GB | 786593 A | 11/1957 |
| WO | WO 2005/008091 A | 1/2005 |

OTHER PUBLICATIONS

International Search Report dated Feb. 5, 2009 with English translation of relevant pages. Six (6) pages.

* cited by examiner

*Primary Examiner* — David D Le
*Assistant Examiner* — Erin D Bishop
(74) *Attorney, Agent, or Firm* — Crowell & Moring LLP

(57) ABSTRACT

A differential provided with a drive wheel comprising two pairs of bevel gears disposed in a two-part housing, one of the pairs of bevel gears being a pair of axle bevel gears and the other pair of bevel gears being a pair of compensating bevel gears.

4 Claims, 5 Drawing Sheets

DIFFERENTIAL PROVIDED WITH A DRIVE WHEEL

CROSS REFERENCE TO RELATED APPLICATIONS

This application is a continuation of international patent application no. PCT/DE2008/000576, filed Apr. 4, 2008 designating the United States of America, and published in German on Oct. 16, 2008 as WO 2008/122276, the entire disclosure of which is incorporated herein by reference. Priority is claimed based on Federal Republic of Germany patent application nos. DE 10 2007 016 939.8, filed Apr. 5, 2007, and DE 10 2008 017 221.9, filed Apr. 4, 2008.

BACKGROUND OF THE INVENTION

Differentials provided with a drive wheel, especially for motor vehicles, have become well-known, for example, from U.S. Pat. No. 6,176,152. Differentials of this type are provided with one pair of differential pinions and one pair of axle bevel gears in a housing formed from two halves or parts, whereby the one housing part also has the flange for the ring gear, which generally is manufactured by forging or by forging and subsequent ring rolling, wherein the metal-cutting and the heat treatment and optionally fine machining of the gearing occurs after the forging. Afterwards, the ring gear is fastened to the flange part, e.g., welded, riveted, screwed or the like.

With respect to the prior art, this US patent specification refers to an embodiment in which the housing and the flange-like fastening area for the ring gear are a one-piece casting. Since this spherical and one-piece differential housing, which is provided with a fastening flange for the ring gear, must be manufactured by casting, it is associated with an expensive metal-cutting in connection with poor accessibility, especially to the interior areas. The assembly of the differential shaft as well as of the differential pinions and axle bevel gears on their axles and into the housing is also extremely difficult, awkward, and expensive. In addition, slide inserts are also provided between the bevel gears and the housing surfaces adjacent to the rear, which increases the aforementioned disadvantages of assembly in view of the narrow space conditions that prevail there and due to the poor accessibility.

In the apparatus of this US patent specification, the housing is constructed as two parts, whereby, however, the two housing parts are each produced by press rollers starting from a round blank, and are subsequently joined together after the chip-forming machining operations. In addition, the ring gear still has to be attached. The attachment of the ring gear results in a high labor cost, particularly since the joint surfaces on both the ring gear and on the fastening area of the flange have to be machined, and with high precision, so that the concentricity and flatness requirements for the overall assembly can be met. In this regard, if tolerances from the machining of the individual parts unfavorably coincide, they can exacerbate the assembly tolerances.

SUMMARY OF THE INVENTION

It is an object of the present invention to provide a differential which is improved in relation to the state of the art.

Another object of the invention is to eliminate the stated tolerances and provide a differential that is inexpensive and simple to manufacture and that distinguishes itself through the possibility of simple machining of the functional surfaces and a reduction in the number of components as well as by easier and low-cost assembly.

Yet another object is to provide a differential of reduced weight and which requires less installation space.

A further object is to provide a differential which facilitates easy connection of drive and output shafts to the differential in order to furthermore create favorable circumstances for direct connection of joints and jointed shafts in order enable the use of joints that are more compact, especially constant velocity joints with an insertable connection instead of a flange connection.

Moreover it is an object of the invention to provide a differential comprising a greater number of preassembled parts.

In a first embodiment of the invention, a differential provided with a drive wheel and comprising pairs of bevel gears accommodated within a multi-part housing, namely one pair of axle bevel gears and one pair of differential pinions or compensating bevel gears which are rotatably mounted in the housing on bearing shafts or pins, one of the housing parts is constructed integrally in one-piece with the flange and the gearing of the drive wheel.

The one-piece construction of the one housing part with the flange of the drive wheel and the gearing first of all reduces the number of individual parts that would otherwise have to be manufactured separately, eliminating the necessary joint surfaces as well as the machining of these surfaces and their assembly.

The two-part construction of the housing leaves the housing open to a simple machining of the functional surfaces inside, the bearing surfaces for the bevel gears and for the sliding parts provided between the bevel gear and bearing surfaces and, optionally, for the machining of the bearing locations for the bevel gear shafts and the receiving bores for the bearing shafts of the compensating bevel gears.

To this end, it is advantageous if the two housing parts are connected to one another by a parting plane or connecting surface joint which is advantageously disposed at least approximately coaxially to the gearing of the drive wheel. For this purpose the parting plane or connecting surface on both of the parts can be divided into an annular centering surface and an axial contact surface.

If according to another aspect of the invention, the one housing part together with the flange and the gearing and/or the other housing part is manufactured by a mass forming process, such as cold forming and/or hot forming, i.e., forging, extrusion or the like, then other advantages arise, namely first a high degree of material utilization, because not insubstantial amount of waste arises when manufacturing the separate ring gear according to the state of the art, e.g., by forging and subsequent ring rolling. In contrast to a two-part construction comprising a housing part having a flange part and a separate ring gear produced by forging and subsequent ring rolling, the present invention also reduces material consumption to the extent that does not produce slugs that are unavoidably produced in forging.

Moreover, in contrast to an embodiment with screwed-on ring gear, for example, it is possible to save material by omitting areas of the ring gear and flange that axially or radially overlap one another. Mass forming furthermore offers the advantage of producing close to final contours, so that the amount of machining required is reduced and the wall thicknesses as a whole can be made smaller, because of both the smaller machining allowance and the greater strength in comparison to castings.

In addition, it is possible to save weight and material by providing recesses in the flange area, whereby it can at least be particularly advantageous in this respect if the drive wheel is constructed with a spoke-like structure, so that only relatively thin, light-weight webs remain between the hub area and the geared area.

Moreover, it may be advantageous to construct the differential such that the housing part that is of integral one-piece construction with the drive wheel having the gearing is the part that has the receiving openings for the bearing shaft or shafts for the compensating bevel gears.

In many applications, however, it may be advantageous if the housing part that is constructed integrally in one-piece with the drive wheel carrying the gearing is not the one that accommodates the bearing shafts of the compensating bevel gears, but instead is the other housing part. Then the housing part with the receiving openings for accommodating bearing shafts of the compensating bevel gears may be the larger housing part, i.e., the differential casing, and the other housing part with the drive wheel may be considered the lid or cover for the differential casing.

In accordance with another embodiment of the invention, it can be advantageous if at least one of the axle bevel gears, and/or in certain embodiments at least one of the compensating bevel gears, is constructed in one piece with its associated bevel gear shaft. Among other things, this has the advantage that no kind of machining, like broaching, gear milling or hobbing, needs to be performed on either the bevel gear or on the connecting area of the pin, in contrast to conventional arrangements in which the bevel gear and pin are separately manufactured parts that must then be assembled to each other.

It can furthermore be advantageous if at least one of the bevel gears has a recess in its end face as viewed in the direction facing toward the shaft, and/or a recess is provided in the bearing shaft on the side opposite from the aforementioned end face, so that material and weight can also be saved in this case without impairing strength. The formation of the recess does not require any additional shop operations because the recess can be formed in one of the operations which is required anyway.

If the compensating bevel gears and mounting shaft are not constructed in one-piece, then it is possible to use an individual mounting shaft for each of the axle bevel gears. This individual mounting shaft may be press fit into its corresponding housing half in order to mount the differential pinions. This results in easier assembly than in conventional differentials.

If at least one of the compensating bevel gears is constructed in one-piece with its mounting pin, then it may be advantageous to construct this pin or shaft only as a stub or projection, which then serves a centering function, but not a mounting function, for the compensating bevel gear and which then also does not need to extend all the way through the corresponding housing part.

Particularly if the axle bevel gear and/or compensating bevel gear is constructed in one piece with its associated shaft, it is possible in a further embodiment to advantageously connect the corresponding drive shafts, such as side shafts, propeller shafts or power take-off shafts, directly to the bevel gear shaft projecting from the differential housing. Moreover such a connection can be achieved without an expensive flange connection. These types of connections of drive shafts to bevel gear shafts which have splines and project outwardly from the differential can be constructed in a particularly advantageous manner as described, for example, in the published German patent application nos. DE 10 2006 039 575; DE 10 2004 048 079 and DE 103 44 703, European patent application no. EP 1,519,063 and international patent application nos. WO 98/35174 and WO 2006/037389, and such connections are considered to be within the scope of the present invention.

The present invention also relates to an axle assembly for motor vehicles, for use either between two drive elements, for example, between a transmission and a differential, or between a distributor gearbox and a differential, particularly a differential for a driven front axle, or else between a transmission and a driven wheel comprising a differential, particularly a differential in which at least one of the axle bevel gears is constructed in one-piece with its associated bevel gear shaft and to which the joint inner part of a constant velocity rotary joint can be attached to the side of the axle assembly opposite to the axle bevel gear by means of a connection such as a spline, and wherein the drive shaft of the axle assembly can be attached to the joint outer part, and wherein there is provided, between the axle bevel gear and the other gear or the wheel to be driven, at least one unit that allows longitudinal displacement. This unit that allows longitudinal displacement may advantageously be a constant velocity rotary joint which also allows axial displacement.

For this purpose, particularly if the axle bevel gear is constructed in one-piece with the bevel gear shaft, the end of the bevel gear shaft or shafts facing the corresponding drive shaft can have a profile, such as longitudinal gear teeth, which serves to accommodate an inner joint part of a constant velocity rotary joint, with a drive shaft being connected to the joint outer part of the constant velocity joint.

Another advantageous embodiment results if the differential casing is provided with recesses or cut-outs, which again result in weight and cost savings.

The aforementioned joint between the differential casing and the other housing part is preferably provided outside the radial supporting area for the compensating bevel gears. This ensures low wear, because the bevel gears do not then have to slide over any joints.

Another embodiments of the invention is formed if the differential casing has a bow-shaped construction and then contains only the receiving openings or bearing positions for the bearing bolts, bearing pins or bearing shafts of the compensating bevel gears and one of the bearing shafts of one of the bevel gears. This represents the optimum form of possible material savings, which however can be even further improved by recesses or cut-outs in the bows, depending on the strength requirements.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF ILLUSTRATIVE EMBODIMENTS

Figure 1:
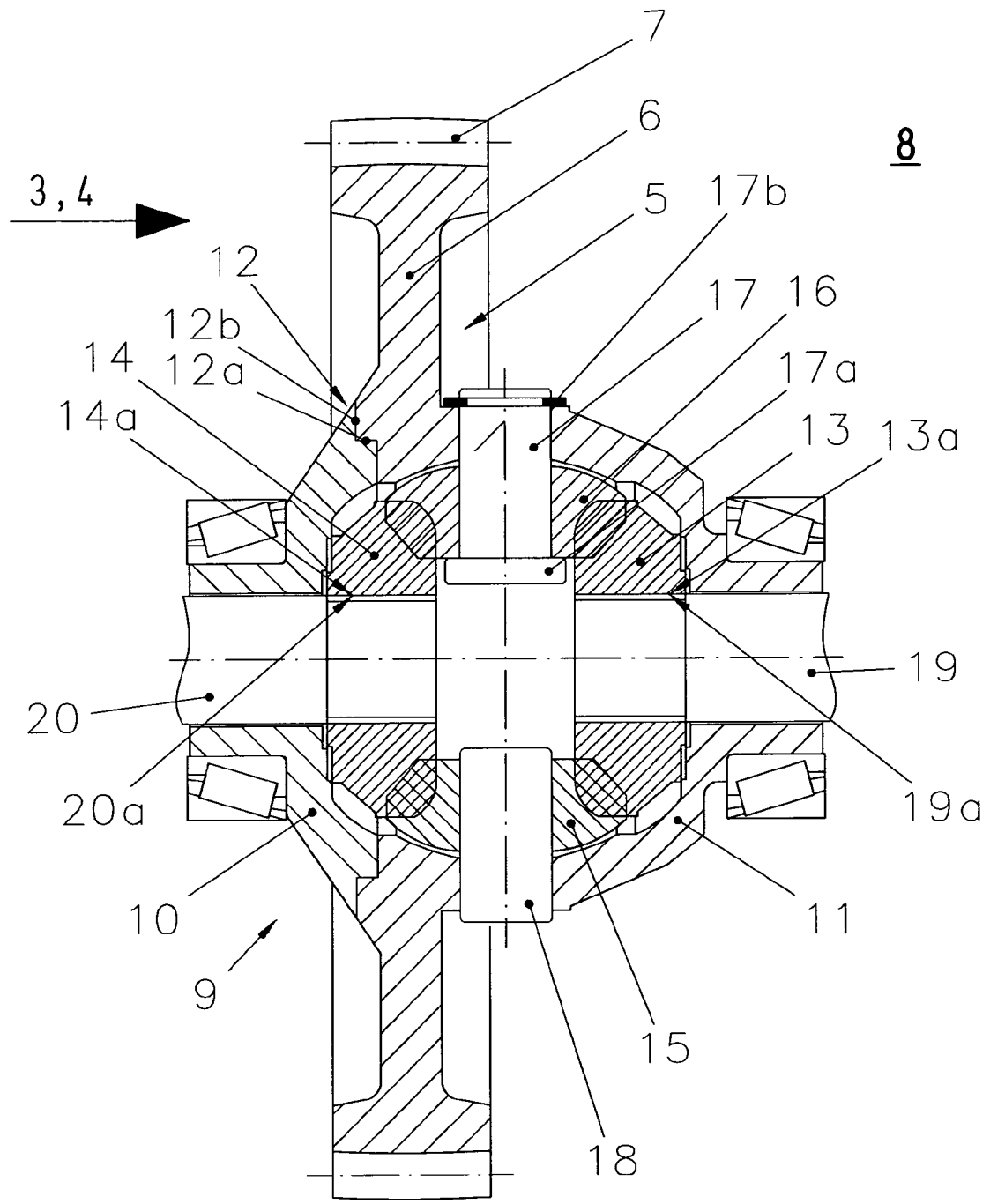
FIG. 1 shows a longitudinal sectional view of an embodiment of the differential according to the invention.

FIG. 1 shows the differential 8 provided with a drive wheel 5 having gear teeth 7 provided on a flange area 6 of the drive wheel 5. In this case, a housing 9 comprises two housing halves 10, 11, which are joined together at a connecting surface 12. This connecting surface 12 comprises a centering surface 12a for each housing part, and a contact surface 12b also is formed on each of the two housing parts. The housing 9 contains a pair of axle bevel gears 13, 14 and a pair of compensating bevel gears 15, 16. The compensating bevel gears 15, 16 are each rotatably mounted on a bearing shaft 17, 18. In this embodiment, the bearing shaft 18 is secured in the housing part 11 by a press fit. The bearing shaft 17 has a collar 17a and is secured by a spring ring or retaining ring 17b.

In this embodiment, two mounting shafts 17, 18 are provided for the compensating bevel gears 15, 16, in contrast to conventional differentials used heretofore in which a single continuous compensating gear shaft is used. The separately constructed shafts facilitate easier assembly and save weight.

The axle bevel gears 13, 14 are mounted on the bevel gear shafts 19, 20 by tapered spline teeth 13a, 14a engaging mating teeth 19a, 20a on the shafts. In this embodiment, the compensating bevel gears 15, 16 are accommodated within that housing part 11 on which the integral flange 6 also is formed. The gear teeth 7 are manufactured in one-piece with the flange and indeed are produced together with the flange part and the housing part 11 by mass forming and subsequent machining. In this embodiment, the housing part 11 represents the differential casing.

After the compensating gear shafts 17, 18, the compensating bevel gears 15, 16 and the axle bevel gears 13, 14 (with or without preassembled bevel gear shafts 19, 20) have been assembled, the housing part 11 is closed by attaching the housing part 10, which is designed as a lid. The housing parts 10 and 11 are then advantageously welded together.

Figure 2:
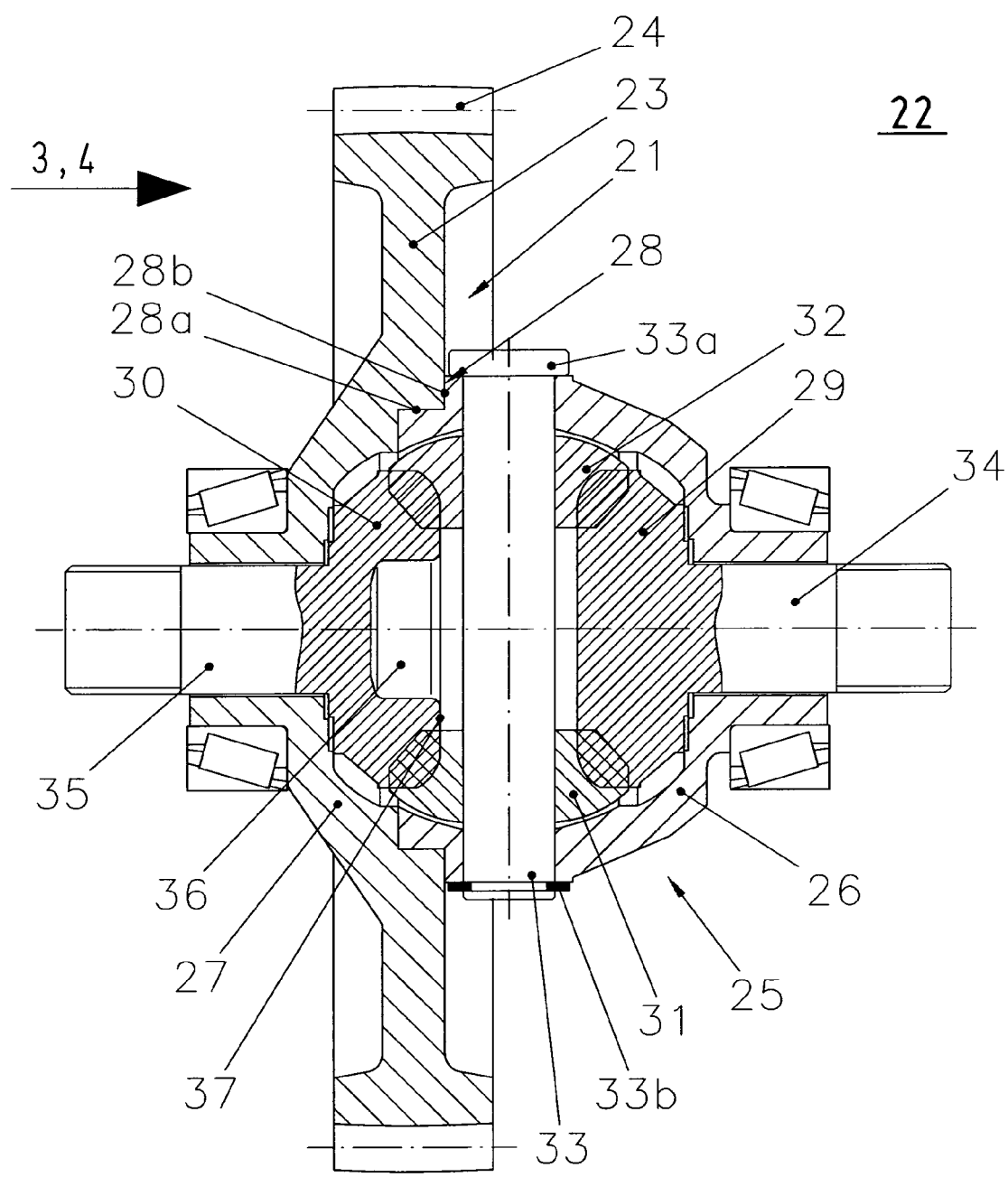
FIG. 2 shows another variant embodiment of the differential of the invention.

The drive wheel 21 of the differential 22 with its flange area 23 and the gearing 24, which is likewise formed one-piece, can again be seen in FIG. 2. The housing 25 likewise comprises two housing halves 26 and 27, which are again joined together at a connecting surface 28, which can be welded. The housing 25 contains the two axle bevel gears 29, 30 and the two compensating bevel gears 31, 32. In this case the compensating bevel gears 31, 32 are mounted on a single continuous compensating gear shaft 33 extending through the housing.

In the illustrative embodiment of FIG. 2, the housing part 27, which carries the flange and the gearing, is configured as a type of cover or lid for the other housing part, the differential casing 26. In this case, the axle bevel gears 29, 30 are constructed integrally in one piece with their respective bearing shafts 34, 35, namely by mass forming. The axle bevel gear 30 illustrates a possibility for further weight savings in that a recess 36 is introduced therein proceeding from the end face 37. The connecting surface 28 again comprises the contact surfaces labeled 28b and the centering surfaces labeled 28a. In this case the shaft 33 is constructed as a continuous shaft extending through the housing and is secured by a collar 33a and a retaining ring 33b.

Figure 3:
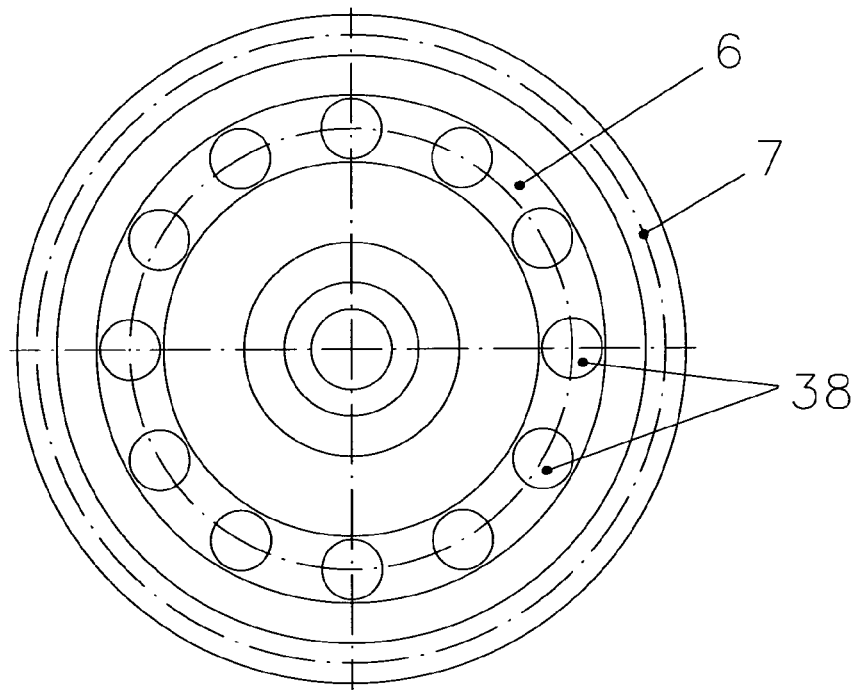
FIGS. 3 and 4 each show a view in the direction of arrow 3 or 4 of FIG. 1 or FIG. 2, respectively.

The flange area 6 and the geared area 7 formed thereon can be seen in FIG. 3. The flange area 6 is interrupted by recesses or cut-outs 38, which can be introduced by producing openings during the forming operation and thus save weight.

Figure 4:
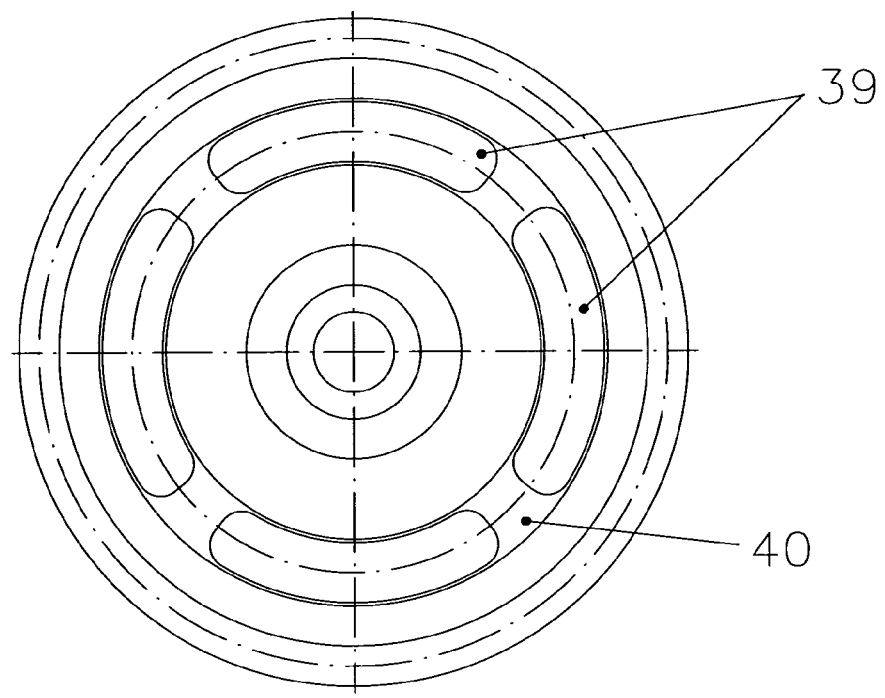

In FIG. 4, the cut-outs 39 in the flange area are enlarged and only several relatively small webs or spokes 40 remain.

It can be seen that in the embodiments according to the present invention, the number of individual parts required has been reduced in comparison with the prior art and the accessibility of the interior area for machining and assembly has been considerably improved. The assembly of the synthetic resin lubricating means, which are introduced between the compensating bevel gears and axle bevel gears and the facing housing surfaces, is also facilitated. Moreover the elimination of the centering surfaces between the ring gear and the flange reduces the number of machining operations. Material usage is reduced because axially or radially overlapping areas of the flange and of the ring gear are not necessary. Moreover the precision, i.e., concentricity and planar alignment, are improved and weight is saved.

The connection of drive shafts, such as side shafts, can be achieved in a particularly advantageous manner by appropriately configuring the ends of shafts 34, 35 correspondingly to the arrangements in the patent documents mentioned above.

Figure 5:
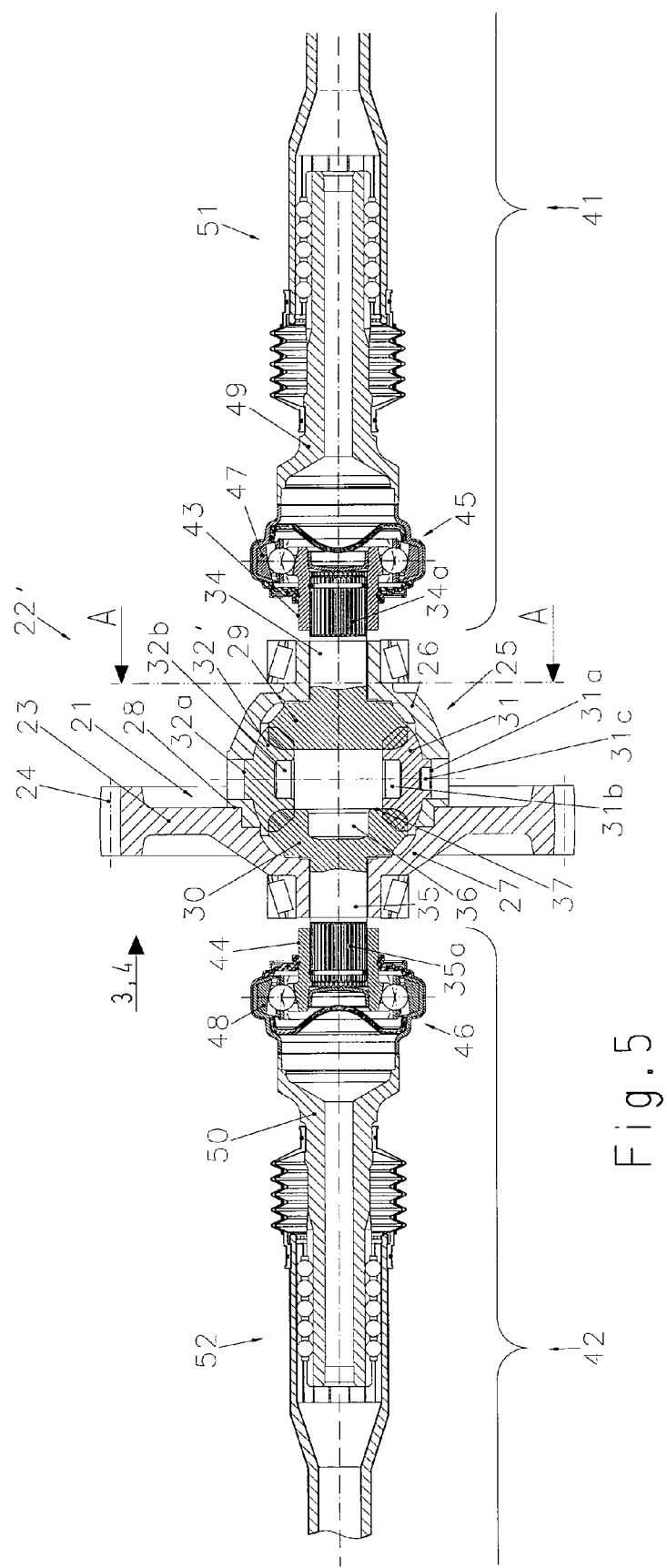
FIG. 5 shows a partial view of an axle assembly with a differential according to the present invention.

FIG. 5 shows a partially illustrated drive assembly comprising a differential 22' and partially illustrated drive shafts 41, 42 connected thereto. The basic construction of the differential 22' corresponds to that of FIG. 2, for which reason identical components have been provided with the same reference characters. The axle bevel gears 29, 30 with their integrally formed axle shafts 35 and 34 and the housing parts 26 and 27 can again be seen in this figure.

The compensating bevel gears 31' and 32' each have an integrally formed bearing shaft 31a and 32a, which in this case is constructed as a stub shaft, resulting in easier assembly. These stubs shafts serve essentially to center the compensating bevel gears. The compensating bevel gears are each provided with a recess 31b, 32b, which saves weight. The side of the differential pinions 34, 35 facing away from the bevel gearing each have tapered spline teeth 34a, 35a by means of which the inner hubs 43, 44 of constant velocity fixed ball joints 45, 46 are mounted thereon in a rotationally fixed manner. Axial fixation is achieved by means of retaining rings or snap rings as shown.

The two drive shaft parts 49, 50 are linked to the joint outer parts 47, 48 by crimps or beads. The drive shaft parts 49, 50 are connected to other parts of the drive shafts 51, 52 by a ball displacement unit and lead to the drive wheels through another constant velocity joint, which is not shown here.

The differentials according to the invention can also be used for rear-wheel drives and also for one-piece and multi-piece drive shafts or cardan shafts or power take-off shafts.

Figure 6:
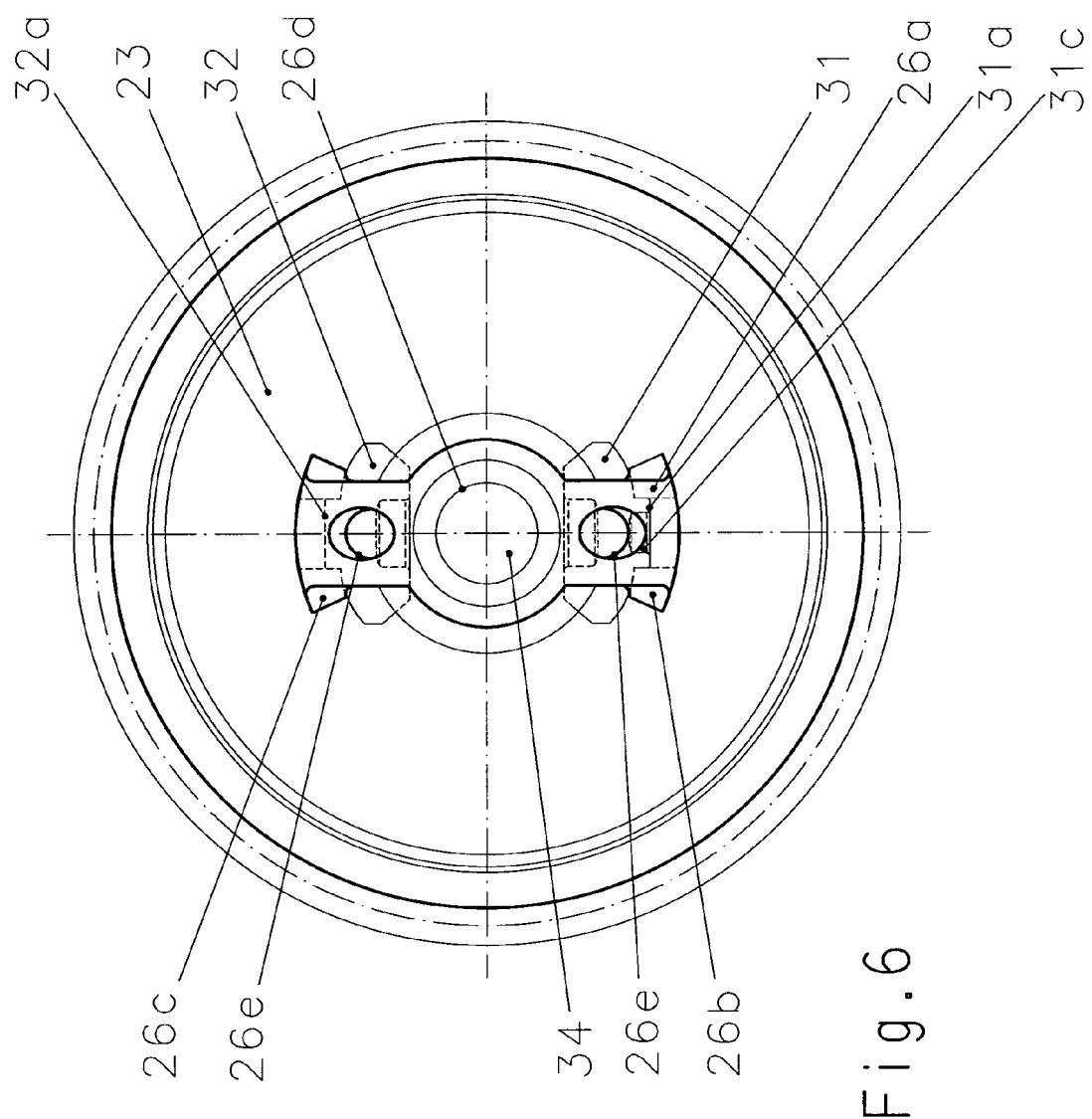
FIG. 6 shows a sectional view taken along line A-A of FIG. 5.

FIG. 6 shows another possible embodiment of the housing half 11, which is also referred to as the differential casing and has been depicted as bell-shaped or basket-like in the earlier figures. In FIG. 6, this housing part 26a is constructed with a bow-shaped or U-shaped configuration and carries the bearing shafts 31a, 32a provided in bearing recesses for the compensating bevel gears 31, 32 on its U-shaped ends 26b, 26c. One recess 26d serves as bearing seat for the bevel gear shaft 34. The legs of the U-shaped "differential carrier" are fixedly connected, e.g., welded, to the drive gear wheel 23 by the connecting surfaces 28 of FIG. 5, which are not shown here. It is furthermore possible to save weight by introducing recesses 31c in the bearing shafts 31a, 32a as in FIG. 5. The openings 26e represent a further possibility for saving weight. The types of openings corresponding to FIGS. 4 and 5 can also be provided in the differential casings 11 and 26 of FIGS. 1 and 2.

The foregoing description and examples have been set forth merely to illustrate the invention and are not intended to be limiting. Other advantageous embodiments may be constructed by combining together various features described above and/or illustrated in the drawings and/or described in the documents cited above, which are incorporated herein by reference. Since modifications of the described embodiments incorporating the spirit and substance of the invention may occur to persons skilled in the art, the invention should be construed broadly to include all variations within the scope of the appended claims and equivalents thereof.

The invention claimed is:

1. A differential comprising:
   a two-part housing in which a pair of axle bevel gears and a pair of compensating bevel gears are rotatably mounted; and
   a drive wheel comprising a flange with gearing thereon, wherein
   each of said axle bevel gears is formed integrally in one piece with a respective individual axle bevel gear shaft,
   each of said compensating bevel gears is formed integrally in one piece with a respective individual compensating bevel gear shaft,
   at least one of said axle bevel gears is provided with a recess in an end face opposite from the at least one axle bevel gear shaft with which the axle bevel gear is formed integrally in one piece,
   at least one of the axle bevel gear shafts is provided with longitudinal teeth for connecting said at least one axle bevel gear shaft to an inner joint part of a constant velocity joint, said constant velocity joint having an outer joint part connected to a drive shaft,
   at least one of said compensating bevel gear shafts is configured to provide a centering shoulder for the compensating bevel gear integrally formed with said at least one compensating bevel gear shaft,
   one of the two housing parts is a differential casing provided with openings for receiving the compensating bevel gear shafts and forms directly a supporting bearing surface for one of said compensating bevel gears rotatably mounted thereon,
   the flange and the gearing of the drive wheel are constructed integrally in one piece with the one of the two housing parts serving as the differential casing,
   the flange comprises a hub and a plurality of spokes extending radially between the hub and the gearing, and
   the one of the two housing parts serving as the differential casing is provided with recesses.

2. The differential according to claim 1, wherein the two housing parts are joined together at a connecting surface arranged coaxially to the gearing of the drive wheel.

3. The differential according to claim 2, wherein said connecting surface comprises a centering surface and an axial contact surface on each of the two housing parts.

4. The differential according to claim 2, wherein the connecting surface between the two housing parts is arranged outside a mounting area of the compensating bevel gears.

* * * * *